(12) United States Patent
Armangau et al.

(10) Patent No.: US 9,747,222 B1
(45) Date of Patent: Aug. 29, 2017

(54) DYNAMIC INGESTION THROTTLING OF DATA LOG

(71) Applicant: EMC IP Holding Company LLC, Hopkinton, MA (US)

(72) Inventors: Philippe Armangau, Acton, MA (US); Bruce E. Caram, Hudson, MA (US); Christopher A. Seibel, Walpole, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/086,644

(22) Filed: Mar. 31, 2016

(51) Int. Cl.
*G06F 12/00* (2006.01)
*G06F 13/00* (2006.01)
(Continued)

(52) U.S. Cl.
CPC ........ *G06F 12/124* (2013.01); *G06F 12/0804* (2013.01); *G06F 13/1642* (2013.01);
(Continued)

(58) Field of Classification Search
CPC ...... G06F 12/00; G06F 12/08; G06F 12/0802; G06F 12/0804; G06F 12/0806; G06F 12/12; G06F 12/121; G06F 12/122; G06F 12/123; G06F 12/124; G06F 12/125; G06F 12/126; G06F 12/127; G06F 12/128; G06F 13/00; G06F 13/14; G06F 13/16; G06F 13/1605; G06F 13/161; G06F 13/1615; G06F 13/1621; G06F 13/1626; G06F 13/1631; G06F 13/1636; G06F 13/1642; G06F 13/1647; G06F 13/1652; G06F 13/1657;
(Continued)

(56) References Cited

U.S. PATENT DOCUMENTS 5,926,834 A * 7/1999 Carlson .............. G06F 12/0862
　　　　　　　　　　　　　　　　　　　　　711/118
6,256,634 B1 * 7/2001 Moshaiov ......... G06F 17/30008
(Continued)

OTHER PUBLICATIONS

Quest for high-performance bufferless NoCs with single-cycle express paths and self-learning throttling; Daya et al; 53nd ACM/EDAC/IEEE Design Automation Conference; Jun. 5-9, 2016 (6 pages).*

(Continued)

*Primary Examiner* — Daniel C Chappell
(74) *Attorney, Agent, or Firm* — BainwoodHuang (57) ABSTRACT

A technique for controlling acceptance of host application data into a data log in a data storage system includes selectively accepting or refusing newly arriving host data into the data log based on a comparison between an oldest entry in the data log and an age threshold. The age threshold is dynamically updated based on system heuristics. As long as the oldest log entry is younger than the age threshold, the data log continues to accept newly arriving host application data, acknowledging IO requests to host applications as the data specified in those requests is entered into the log. However, when the oldest log entry is older than the age threshold, new log entries are temporarily refused entry into the data log. Instead, newly arriving data are placed in a pending list, where they are kept until the data log is again accepting new log entries.

20 Claims, 5 Drawing Sheets

(51) Int. Cl.
*G06F 13/28* (2006.01)
*G06F 12/123* (2016.01)
*G06F 12/0804* (2016.01)
*G06F 13/42* (2006.01)
*G06F 13/16* (2006.01)

(52) U.S. Cl.
CPC ...... *G06F 13/4234* (2013.01); *G06F 2212/60* (2013.01); *G06F 2212/69* (2013.01)

(58) Field of Classification Search
CPC ............... G06F 13/1663; G06F 13/166; G06F 13/4221; G06F 13/4226; G06F 13/423; G06F 13/4234; G06F 13/4239; G06F 13/4243; G06F 13/4247; G06F 13/4252; G06F 13/4256; G06F 13/426; G06F 13/4265; G06F 13/4269; G06F 13/4273; G06F 13/4278; G06F 13/428; G06F 2212/00–2212/7211
See application file for complete search history.

(56) References Cited

U.S. PATENT DOCUMENTS

| | | | | |
|---|---|---|---|---|
| 7,062,675 B1* | 6/2006 | Kemeny | ............. | G06F 11/1441 711/135 |
| 7,379,999 B1* | 5/2008 | Zhou | ................... | G06F 11/3476 709/224 |
| 7,500,048 B1* | 3/2009 | Venkitachalam | ..... | G06F 12/109 711/147 |
| 7,640,264 B1* | 12/2009 | Chaulk | ............. | G06F 17/30398 |
| 8,271,692 B1* | 9/2012 | Dinh | ...................... | G06F 3/0619 702/127 |
| 8,275,945 B2* | 9/2012 | Tzeng | ................. | G06F 12/0246 710/52 |
| 8,935,484 B2* | 1/2015 | Chang | ................. | G06F 12/0868 711/103 |
| 9,003,168 B1* | 4/2015 | Jouppi | .................. | G06F 15/173 712/200 |
| 9,229,864 B1* | 1/2016 | Kanteti | ............... | G06F 12/0808 |
| 9,413,778 B1* | 8/2016 | Elisha | ................. | H04L 63/1425 |
| 2004/0098541 A1* | 5/2004 | Megiddo | ............... | G06F 12/122 711/129 |
| 2006/0259968 A1* | 11/2006 | Nakakoji | .............. | H04L 63/145 726/22 |
| 2008/0082769 A1* | 4/2008 | Bouchou | ................. | G06F 3/061 711/161 |
| 2010/0142071 A1* | 6/2010 | Wideman | ................ | G06F 13/00 360/15 |
| 2011/0258391 A1* | 10/2011 | Atkisson | ............... | G06F 11/108 711/118 |
| 2012/0066435 A1* | 3/2012 | Colgrove | ................ | G06F 3/061 711/103 |
| 2013/0346719 A1* | 12/2013 | Tomlinson | .............. | G06F 12/10 711/165 |
| 2014/0025834 A1* | 1/2014 | Mergener | ............... | H04L 69/03 709/230 |
| 2014/0195564 A1* | 7/2014 | Talagala | ............. | G06F 12/0804 707/802 |
| 2014/0310499 A1* | 10/2014 | Sundararaman | .... | G06F 12/0269 711/203 |
| 2015/0089154 A1* | 3/2015 | Busaba | ............... | G06F 12/0831 711/141 |
| 2015/0347305 A1* | 12/2015 | Li | ....................... | G06F 12/0875 711/126 |
| 2016/0070652 A1* | 3/2016 | Sundararaman | ...... | G06F 3/0619 711/154 |
| 2016/0147661 A1* | 5/2016 | Ambroladze | ....... | G06F 12/0815 711/130 |

OTHER PUBLICATIONS

What computer architects need to know about memory throttling; Hanson et al; Proceedings of the 2010 international conference on Computer Architecture; Jun. 19, 2010; pp. 233-242 (10 pages).*
Jean-Pierre Bono, et al.; "Coalescing Writes for Improved Storage Utilization"; U.S. Appl. No. 14/576,952, filed Dec. 12, 2014.
Jean-Pierre Bono, et al.; "Managing Data Cache for File System Realized Within a File"; U.S. Appl. No. 14/752,484, filed Jun. 26, 2015.
Philippe Armangau, et al.; "Storing Inline-Compressed Data in Segments of Contiguous Physical Blocks"; U.S. Appl. No. 14/755,164, filed Jun. 30, 2015.

* cited by examiner

DYNAMIC INGESTION THROTTLING OF DATA LOG

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Some data storage systems employ data logs for capturing incoming data. For example, an application running on a host directs an IO (Input/Output) request to a data storage system. The IO request specifies data to be written to a LUN (Logical UNit), file system, VVol (Virtual Volume), or other data object in the data storage system. Rather than immediately placing the data specified in the IO request into a structure of the data object itself, which may involve mapping and other time-consuming tasks, the data storage system instead places the newly arriving data in a data log. The data log holds the newly arriving data temporarily until mapping and other activities can be performed. Once the data is stored in the data log, the data storage system may acknowledge completion of the IO request back to the host application, such that the host application may resume its processing. Later, out of band with incoming IO requests, the data storage system may flush host data from the data log to more permanent structures, e.g., to mapped locations of the LUN, file system, or VVol.

SUMMARY

Data storage systems have limits on the speeds at which they can ingest incoming data, and such speeds may vary based on system load. For example, even though a data log allows a data storage system quickly to acknowledge host applications and allows writes to proceed at high speeds, data logs themselves are finite resources. Once a data log becomes full, it can no longer receive newly arriving data, such that IO requests specifying new data writes may be refused and hosts may have to retry their write requests later. Even if the data log does not become full, other data storage system operations, such as mapping, caching, and/or other downstream activities may become bound, impairing the ability of the data storage system to accept newly arriving host data.

When a data log becomes full and/or another critical resource becomes bound, the speed at which the data storage system can accept new host data may come to a complete halt, or nearly so. Thus, the speed at which a data storage system can accept newly arriving data can vary considerably, e.g., from very high speeds, when resources operate within capacity limits, to very low speeds, when resources become bound.

Unfortunately, performance of host applications may suffer from such wide variations in data ingestion speeds. For example, host applications may be required to change their own speeds of data processing, in response to large changes in data ingestion speeds, in an abrupt and unexpected manner, which renders their own performance inefficient. Further, users of host applications may experience disappointing and unexpected lags in application response times.

In contrast with prior approaches, which can suffer from large and detrimental variations in data ingestion speeds, an improved technique for controlling acceptance of host application data into a data log in a data storage system includes selectively accepting or refusing newly arriving host data into the data log based on a comparison between an oldest entry in the data log and an age threshold. The age threshold is dynamically updated based on system heuristics. As long as the oldest log entry is younger than the age threshold, the data log continues to accept newly arriving host application data, acknowledging IO requests to host applications as the data specified in those requests is entered into the log. However, when the oldest log entry is older than the age threshold, new log entries are temporarily refused entry into the data log. Instead, newly arriving data are placed in a pending list, where they are kept until the data log is again accepting new log entries.

Advantageously, the improved technique avoids large swings in data ingestion speeds. The act of placing data into the pending list delays acceptance of data into the data log and delays delivery of host acknowledgements, but it does not reject the data outright, such that host applications need not retry their IO requests later. Rather, the overall effect of selectively accepting and rejecting host data into the data log is to slow the rate of data ingestion into the data log under high-load conditions, thus preventing a data storage system from reaching a hard limit, such as where the data log becomes full or some other system resource becomes bound. Host applications therefore experience more consistent data ingestion speeds and users experience more consistent performance.

Certain embodiments are directed to a method of dynamically controlling acceptance of host application data into a data log in a data storage system. The method includes generating a throttle signal, the throttle signal having (i) a first value when an oldest log entry in the data log is younger than an age threshold and (ii) a second value when the oldest log entry in the data log is older than the age threshold, the data storage system dynamically updating the age threshold based on a set of heuristics pertaining to the data storage system. The method further includes, in response to the throttle signal having the first value and the data storage system receiving a first IO request from a host application, (i) storing data specified in the first IO request in a first log entry of the data log and (ii) acknowledging completion of the first IO request to the host application. In response to the throttle signal having the second value and the data storage system receiving a second IO request from the host application, the method further includes storing data specified in the second IO request in a pending list. After storing the data specified in the second IO request in the pending list and in response to the throttle signal then assuming the first value, the method still further includes (i) storing the data specified in the second IO request in a second log entry of the data log and (ii) acknowledging completion of the second IO request to the host application.

Other embodiments are directed to a data storage system constructed and arranged to perform a method of dynamically controlling acceptance of host application data into a data log, such as the method described above. Still other embodiments are directed to a computer program product. The computer program product stores instructions which, when executed on control circuitry of a data storage system, cause the data storage system to perform a method of dynamically controlling acceptance of host application data into a data log, such as the method described above. Some embodiments involve activity that is performed at a single location, while other embodiments involve activity that is distributed over a computerized environment (e.g., over a network).

The foregoing summary is presented for illustrative purposes to assist the reader in readily understanding example features presented herein and is not intended to be in any way limiting.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for controlling acceptance of host application data into a data log in a data storage system includes selectively accepting or refusing newly arriving host data into the data log based on a comparison between an oldest entry in the data log and an age threshold. The age threshold is dynamically updated based on system heuristics. Data refused entry into the data log are placed in a pending list, where they are kept until the data log is again accepting new log entries.

Figure 1:
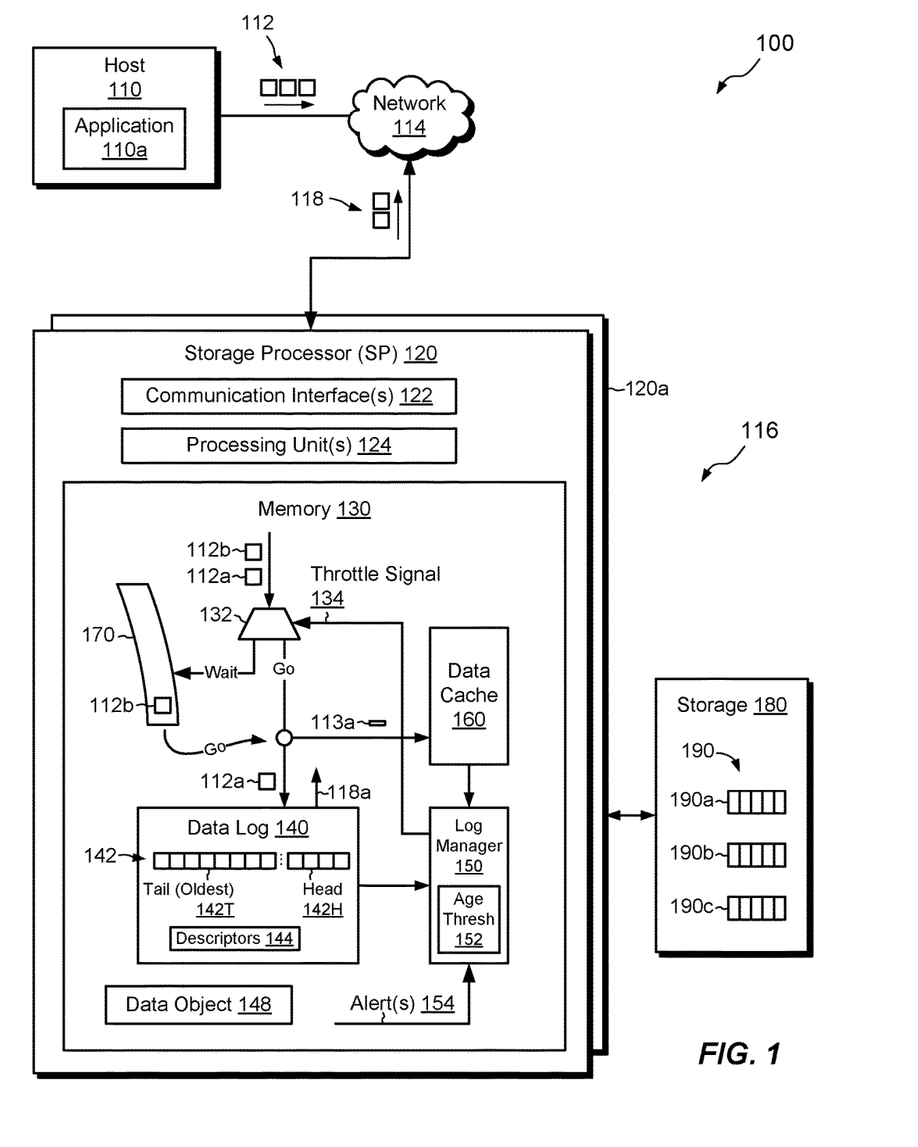
FIG. 1 is a block diagram showing an example environment in which embodiments of the improved technique hereof may be practiced.

FIG. 1 shows an example environment 100 in which embodiments of the improved technique hereof can be practiced. Here, a host computing device ("host") 110 connects to a data storage system 116 over a network 114. The host 110 runs a host application 110a. In some arrangements, multiple hosts 110 are present, with each host running its own host application 110a and with the host applications accessing the data storage system 116 over the network, effectively in parallel.

The data storage system 116 includes a storage processor, or "SP," 120 and storage 180, such as magnetic disk drives, electronic flash drives, and the like. In an example, the storage 180 is arranged in RAID (Redundant Array of Inexpensive/Independent Disks) groups 190. Three RAID groups 190a, 190b, and 190c are shown, although any number may be provided. The data storage system 116 may include multiple SPs like the SP 120 (e.g., a second SP, 120a). In an example, multiple SPs may be provided as circuit board assemblies, or "blades," which plug into a chassis that encloses and cools the SPs. The chassis has a backplane for interconnecting the SPs, and additional connections may be made among SPs using cables. No particular hardware configuration is required, however, as any number of SPs, including a single SP, may be provided and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The host 110 may connect to the SP 120 using various technologies, such as Fibre Channel, iSCSI, NFS, SMB 3.0, and/or CIFS, for example. As is known, Fibre Channel and iSCSI are block-based protocols, whereas NFS, SMB 3.0, and CIFS are file-based protocols. The SP 120 is configured to receive IO requests 112 according to block-based and/or file-based protocols and to respond to such IO requests 112 by reading or writing the storage 180. The SP 120 provides an acknowledgement 118 back to the host application 110 for each IO request 112 specifying a data write once that write is complete.

The SP 120 includes one or more communication interfaces 122, a set of processing units 124, and memory 130. The communication interfaces 122 include, for example, SCSI target adapters and/or network interface adapters for converting electronic and/or optical signals received over the network 114 into electronic form for use by the SP 120. The set of processing units 124 includes one or more processing chips and/or assemblies. In a particular example, the set of processing units 124 includes numerous multi-core CPUs, along with associated coprocessors and chipsets. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by data structures and by operation of executable instructions, a data log 140, a data object 148, a log manager 150, a data cache 160, and a pending list 170. The data log 140 supports the data object 148 by temporarily storing data to be written to the data object 148. The data log 140 includes log entries 142 and log descriptors 144. In an example, each log entry 142 stores data specified by a respective IO request 112 received from the host 110 (or from another host). The log descriptors 144 store metadata pertaining to log entries 142, such as their locations within the data log 140, the logical addresses into the data object 148 to which the data to be written pertains, timestamps recording the time the respective IO requests were received, and so forth.

Figure 3:
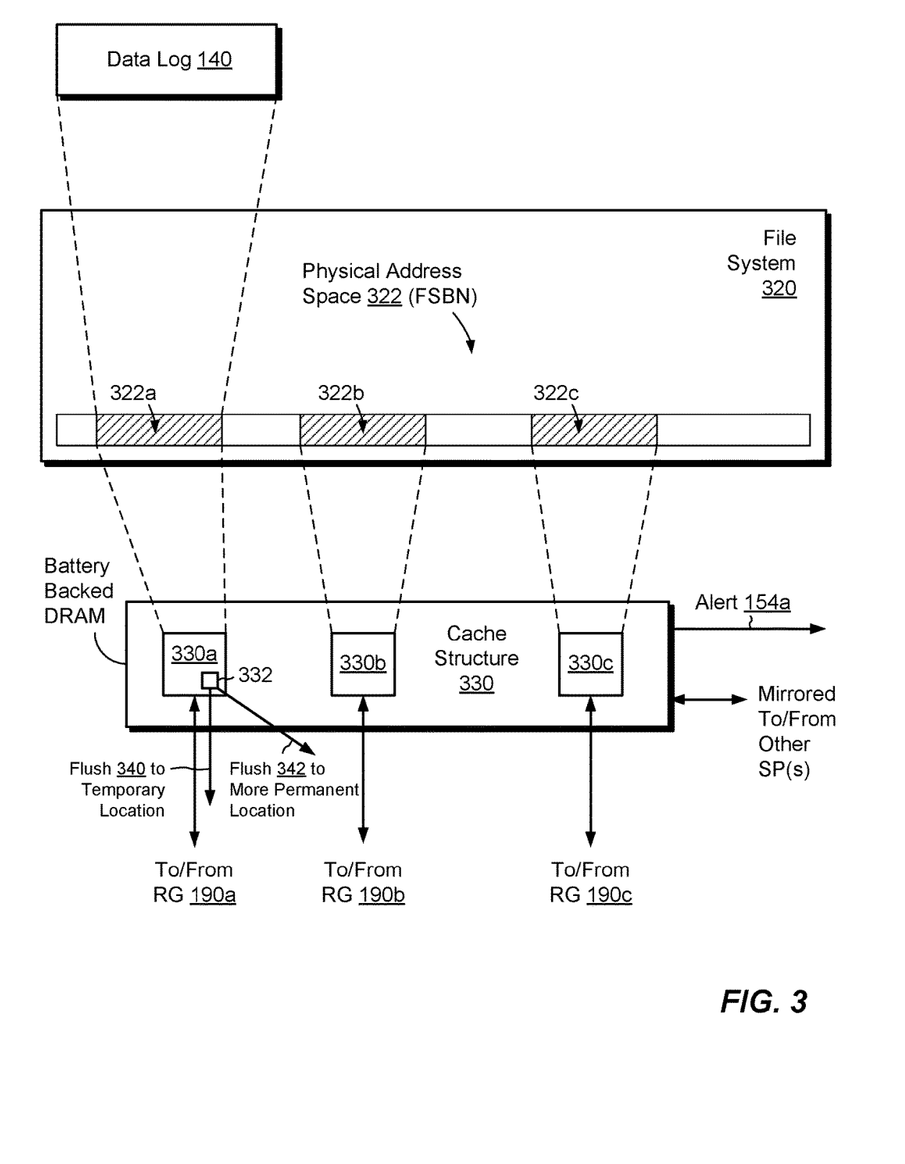
FIG. 3 is a block diagram showing an example arrangement of system structures that support the data log of FIG. 1.

In an example, the data log 140 is specific to an internal file system of the data storage system 116 that stores the data object 148 and its snaps (point-in-time versions; see FIG. 3 for further details). The data object 148 may itself be a LUN, a file system, or a VVol, for example. In an example, the data storage system 116 includes multiple data logs, like the data log 140, e.g., one data log for each internal file system. This is merely an example, however, as the data log 140 may be provided at any suitable level of granularity.

In an example, the data log 150 is implemented with DRAM (Dynamic Random Access Memory), but the DRAM is battery-backed and mirrored, e.g., to SP 120a, such that the data storage system 116 can sustain a power failure or system panic without the contents of the data log 140 being lost. The data log 140 may thus be regarded as a persistent structure, even though it may be implemented using non-volatile memory. The log manager 150 manages operation of the data log 140.

The data cache 160 stores metadata describing log entries 142. In an example, the data cache 160 is common to all data logs in the data storage system 116. The data storage system 116 can access the data cache 160 to determine quickly both (a) whether specified data currently resides in a data log and (b) the location in a data log of the requested data. In an example, the data cache 160 uses a hash function to relate logical addresses of data objects with corresponding memory locations. Each of the memory locations stores either a physical address in a data log, where the data at the specified logical address can be found, or a null indicator if no log entry exists. The data cache 160 thus enables fast access to data written to the data log 140, e.g., for responding quickly to host read requests. In an example, the data cache 160 is implemented with non-volatile memory devices (e.g., DRAM), which is not battery-backed or mirrored. In the event of a power failure or system panic, the data storage system 116 can reconstitute the contents of the data cache 160 from the log descriptors 144 in the data log 140, or from multiple data logs if that is the arrangement.

The pending list 170 stores host data that is temporarily refused entry into the data log 140. In an example, the pending list 170 is configured as a FIFO (First-In, First-Out) and is implemented in non-volatile memory, such as DRAM, which is not battery-backed or mirrored.

In the example shown, the data log 140 is arranged as a circular buffer having a head 142H and a tail 142T. In general, the log manager 150 stores newly-arriving data at the head 142H, with the head advancing one position as each new log entry 142 is created. Also, the log manager 150 flushes log entries 142 from the data log 140, starting at the tail 142T and proceeding toward the head 142H. Flushing a log entry 142 clears that log entry from the data log 140 and advances the tail 142T. The data log 140 becomes full when the head 142H catches up with the tail 142T.

In an example, the log manager 150 stores data in new log entries 142 in the order that the data storage system 116 receives those data, such that the order of log entries 142 in the data log 140 reflects the order of data received. With this arrangement, log entries 142 near the head 142H tend to be "younger," meaning that their associated timestamps are relatively closer to the current time, whereas log entries 142 near the tail tend to be "older," meaning that their associated timestamps are relatively further from the current time. In general, and although not required, the "oldest" log entry will tend to be the one at the tail 142T.

In example operation, the host application 110a issues IO requests 112 to the data storage system 116. The SP 120 receives the IO requests 112 at the communication interfaces 122 and initiates further processing. The IO requests 112 include requests specifying data writes to the data object 148. In an example, the data storage system 116 performs one of two acts upon receipt of each such IO request: (a) it sends newly arriving data from the IO request directly to the data log 140 or (b) it sends such data instead to the pending list 170. For example, the log manager 150 generates a throttle signal 134. When the throttle signal 134 has a first value, e.g., FALSE, data specified by an incoming write request is sent to the data log 140. However, when the throttle signal 134 has a second value, e.g., TRUE, data is instead sent to the pending list 170.

For instance, assume that a newly arriving IO request 112a specifies data to be written to the data object 148, e.g., by providing a logical address into the data object 148 and a set of data to be stored at that logical address. If the throttle signal 134 is FALSE, a de-selector 132 passes the IO request 112a to the data log 140, where the log manager 150 creates a new log entry 142 for the newly-arriving set of data at or near the current head 142H of the data log 140. Once the set of data has been stored in the new log entry, the log manager 150 issues an acknowledgement 118a. The acknowledgement 118a returns over the network 114 to the initiating host application 110a and indicates that the write has been completed. The host application 110a may then resume its operation. At or around the same time, the log manager 150 also stores metadata 113a in the data cache 160. The metadata 113a includes a location of the new log entry 142 for the IO request 112a, such as a physical address of the new log entry within the data log 140, and the data cache 160 provides a mapping (e.g., the above-described hash function) between the logical address specified in the IO request 112a and the corresponding location in the data log 140. In an example, other newly arriving IO requests 112 that specify writes are treated the same way as long as the throttle signal 134 remains FALSE.

Assume now, however, that a newly arriving IO request 112b specifies a new set of data to be written to the data object 148 but that the throttle signal 134 is TRUE. Now, instead of passing the IO request 112b to the data log 140, the de-selector 132 instead passes the IO request 112b to the pending list 170, where the IO request 112b is held in line until throttle signal 134 changes to FALSE. If other IO requests 112 specifying writes are later received while the throttle signal 134 remains TRUE, such IO requests are similarly passed to the pending list 170, where they are held in line, in the order received, behind the IO request 112b.

At some later time, the log manager 150 changes the throttle signal 134 back to FALSE. The new set of data specified by the IO request 112b is then entered into the data log 140, e.g., near the current head 142H, and an acknowledgment is returned. Also, corresponding metadata are entered into the data cache 150. Any other IO requests waiting in the pending list 170 are similarly processed in the order received, as long as the throttle signal 134 remains FALSE. But if the throttle signal 134 changes back to TRUE, such waiting IO requests are again held, and any newly arriving IO write requests are accumulated, until the throttle signal 134 again changes back to FALSE.

In an example, the log manager 150 generates the throttle signal 134 based on a comparison between an age of the oldest log entry 142, which is shown as coinciding with the tail 142T, and an age threshold 152. The age threshold 152 is specific to the data log 140, and each data log supported by the data storage system 116 may have its own respective age threshold 152. The age of the oldest log entry is based on its timestamp and the current time. The timestamp may be stored, for example, in the log descriptors 144 or elsewhere. In an example, the log manager 150 obtains the age of the oldest log entry by subtracting its timestamp from the current time. The age threshold 152 is measured in milliseconds, for example, although it may be expressed in any suitable units. By performing the above-described comparison, the log manager 150 sets the throttle signal 134 to FALSE whenever the age of the oldest log entry is less than, i.e., younger than, the age threshold 152. Likewise, the log manager 150 sets the throttle signal 134 to TRUE whenever the age of the oldest log entry is greater than, i.e., older than, the age threshold 152.

Preferably, the log manager 150 updates the throttle signal 134 in real-time, i.e., to reflect current conditions as the age of the oldest log entry changes. For example, the contents of the data log 140 may vary, with new log entries 142 being added and old entries being flushed on a nearly continual basis. Thus, the age of the oldest log entry may change quickly as the oldest log entry is flushed and a more recent log entry takes its place. The age of the oldest log entry also changes merely as a result of time advancing. Thus, the throttle signal 134 may switch between TRUE and FALSE values whenever the data log 140 operates with entries at or near the age threshold 152. The effect of such activity is to prevent new log entries 142 from being added to the data log 140 whenever the oldest log entry is older than the age threshold 152.

In an example, the age threshold 152 is not a constant value. Rather, the log manager 150 dynamically updates the age threshold 152 based on a set of heuristics. These heuristics may include the following, for example:
- Age of the oldest entry in the data log 140, e.g., expressed in milliseconds;
- Fullness of the data log 140, e.g., expressed as a percentage of space used over total size of the data log 140;
- Fullness of the data cache 160, e.g., expressed as a percentage of space used over total size of the data cache 160;
- Alert(s) 154, which may be generated by the data log 140, the data cache 160, and/or from one or more other system resources, such as downstream resources that can become inefficient or bound if the data storage system 116 ingests too much host data too quickly.

Thus, the log manager 150 adjusts the age threshold 152 based not only on conditions directly concerning the data log 140 itself, such as its oldest entry or fullness, but also based on input from other resources of the data storage system 116. For example, as indicated above, the data storage system 116 may share the data cache 160 among many data objects, such that fullness of the data cache 160 may be based not only on writes to the data object 148 itself, but also on writes to other data objects. The log manager 150 may then adjust the age threshold 152 for the data log 140 based in part on activities performed on other data objects. In an example, the log manager 152 updates the age threshold 152 on a regular basis, such as every half-second, every second, etc.

The above-described technique of selectively ingesting data into the data log 140 based on a throttle signal 134 has the effect of slowing the rate of acceptance of new data into the data log 140. Such slowing of incoming data allows system activities to keep pace with accepted data and avoids pushing system resources to hard limits. Large swings in data ingestion speeds are therefore avoided and replaced with much gentler variations, which host applications can handle more efficiently and which users are less likely to notice.

Figure 2A:
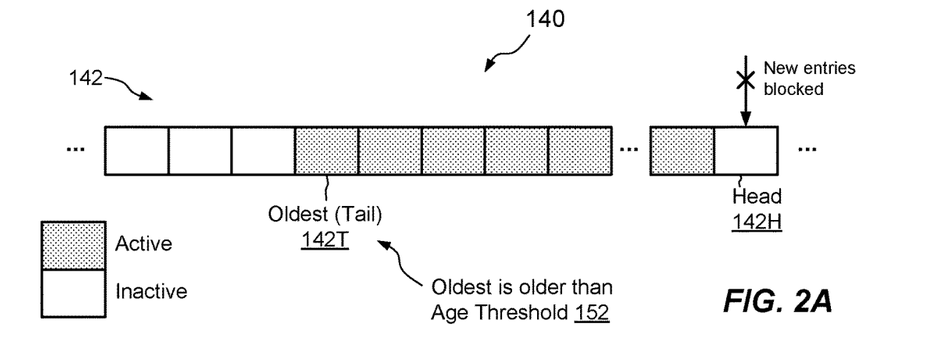
FIGS. 2A-2C is a sequence of diagrams showing states of an example data log of FIG. 1, in which a transition is made between blocking new entries into the data log and allowing new entries in to the data log.
Figure 2B:
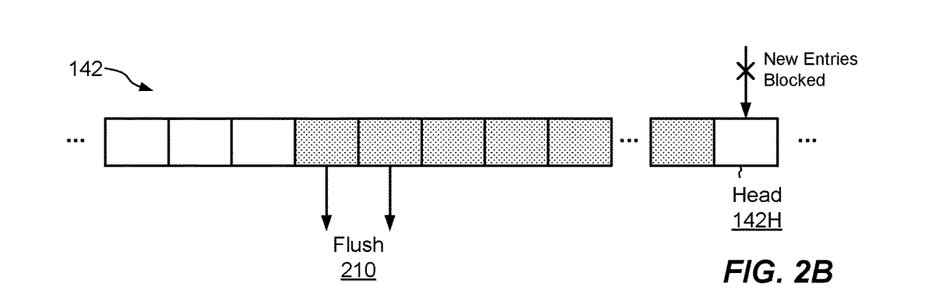
Figure 2C:
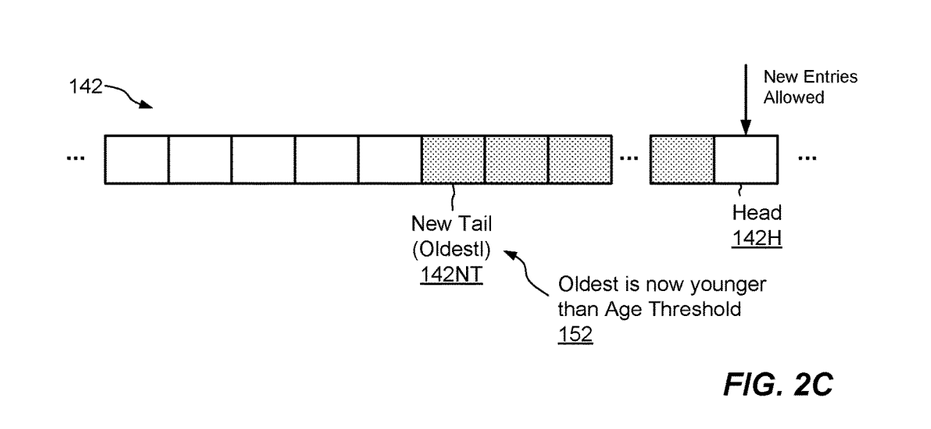

FIGS. 2A to 2C show a transition in the data log 140 from a first state, in which new entries are blocked, to a second state, in which new entries are allowed as a result of flushing log entries 142 from the data log 140. As shown in FIG. 2A, the oldest entry in the data log 140, shown at the tail 142T, is older than the age threshold 152. Therefore, the throttle signal 134 is TRUE and the log manager 150 blocks the data log 140, such that no new log entries 142 are created. Newly arriving IO requests 112 specifying writes to the data object 148 are sent to the pending list 170.

As shown in FIG. 2B, the log manager 150 performs a flushing operation 210 on some log entries 142 close to the tail 142T. In an example, flushing a log entry 142 from the data log 140 involves mapping the data of that log entry 142 to a location in the structure of the data object 148, i.e., to a storage location in one of the RAID groups 190. This is not required, however, as flushing 210 may involve any act of passing the data of a log entry 142 to any downstream structure.

In FIG. 2C, the flushing operation 210 is complete. The indicated log entries 142 close to the tail 142T have been cleared, and the tail has moved forward to position 142NT. As a result of flushing the log entries (FIG. 2B), the oldest log entry is now cleared and there is a new "oldest" log entry, which coincides with the new tail 142NT. Here, the new "oldest" log entry is now younger than the age threshold 152. Accordingly, the log manager 150 changes the throttle signal 134 to FALSE. As long as the throttle signal 134 remains FALSE, any data waiting in the pending list 170 are entered into the data log 140, as are any newly arriving data from the host application 110a, with the log manager 150 entering such data in the order received.

FIG. 3 shows an example arrangement for implementing the data log 140 and for providing an alert 154a to the log manager 150, which alert may be used in adjusting the age threshold 152. Here, the data log 140 is seen to occupy a range 322a within a physical address space 322 of an internal file system 320. The data object 148 and its snaps (if any) occupy range 322b and/or range 322c. In an example, the physical address space 322 is denominated in blocks, with a "block" being the smallest unit of allocatable storage space in the file system 320. A typical block size may be 8 KB, for example, although blocks may be of any suitable size. Each block in the file system 320 has a file system block number (FSBN), and FSBN's may range from zero to a large number.

Given this arrangement, it can be said that the file system 320 "stores" the data log 140 as well as the data object 148 and its snaps. It should be appreciated, however, that the file system 320 is a logical structure and that the actual data and metadata of the file system 320 are placed in the storage 180, e.g., in the RAID groups 190 (FIG. 1).

As further shown in FIG. 3, a cache structure 330 is disposed between the file system 320 and the RAID groups 190. The cache structure 330 may include multiple regions, such as 330a, 330b, and 330c, which correspond, respectively, to file system ranges 322a, 322b, and 322c. Cache region 330a supports the data log 140. The cache regions 330a, 330b, and 330c provide read and write caching for RAID groups 190a, 190b, and 190c, respectively.

In an example, the cache structure 330 is implemented in DRAM, which is battery-backed and mirrored to another SP, such as to SP 120a. Thus, although the cache structure 330 is built from volatile memory devices, it is nevertheless considered to be persistent, as the battery backup and mirroring enable the cache structure 330 to survive a loss of system power. The cache structure 330 is not intended to store host data permanently, however, but rather to hold host data temporarily until such data can be placed in non-volatile storage devices. Also, as the cache structure 330 is considered to be persistent, it enables the data storage system 116 to send acknowledgements 118 in response to host writes once host data are received securely into the cache structure 330.

In an example, the cache structure 330 is configured to detect inefficient operation and to send an alert 154a to the log manager 150 upon such detection. As the inefficient operation may indicate that the cache structure 330 is overburdened, the log manager 150 may take action to increase throttling of the data log 140, e.g., by decreasing the age threshold 152.

For instance, when the log manager 150 writes a new log entry 142 to the data log 140, one of its activities is to place the host data for the new log entry into a page 332 of region 330a. Once placed, the host data remains in page 332 until the cache structure 330 flushes it. Although the data log 140 is supported by RAID group 190a, the cache structure 330 preferably avoids flushing the page 332 to the RAID group 190a unless truly necessary, as the RAID group 190a is merely a temporary location and a more permanent location of the host data resides elsewhere, i.e., in RAID group 190b or 190c (which support storage of the data object 158). For greatest efficiency, the cache structure 330 preferably waits until the data storage system 116 can identify a more permanent, mapped location of the host data and then flushes the host data to the mapped location (arrow 342). In some examples, the cache structure 330 is directed to hold pages supporting the data log 140 for at least N seconds before it can flush, with the assumption that N is large enough to avoid flushing to the temporary location at least most of the time.

However, if N seconds pass and no mapping has occurred, then the cache structure 330 may flush page 332 to RAID group 190a (arrow 340). But since the page is unmapped, the cache structure 330 will have to read back the host data from the RAID group 190a, apply the mapping, and then flush the data to the mapped location. Such flushing to a temporary location is inefficient and indicates that the cache structure 330 may be overly burdened. Accordingly, the cache structure 330 generates alert 154a to inform the log manager 150 of this condition, such that the log manager 150 may take action to slow the ingestion of new host data and give the cache structure 330 an opportunity to catch up.

Figure 4:
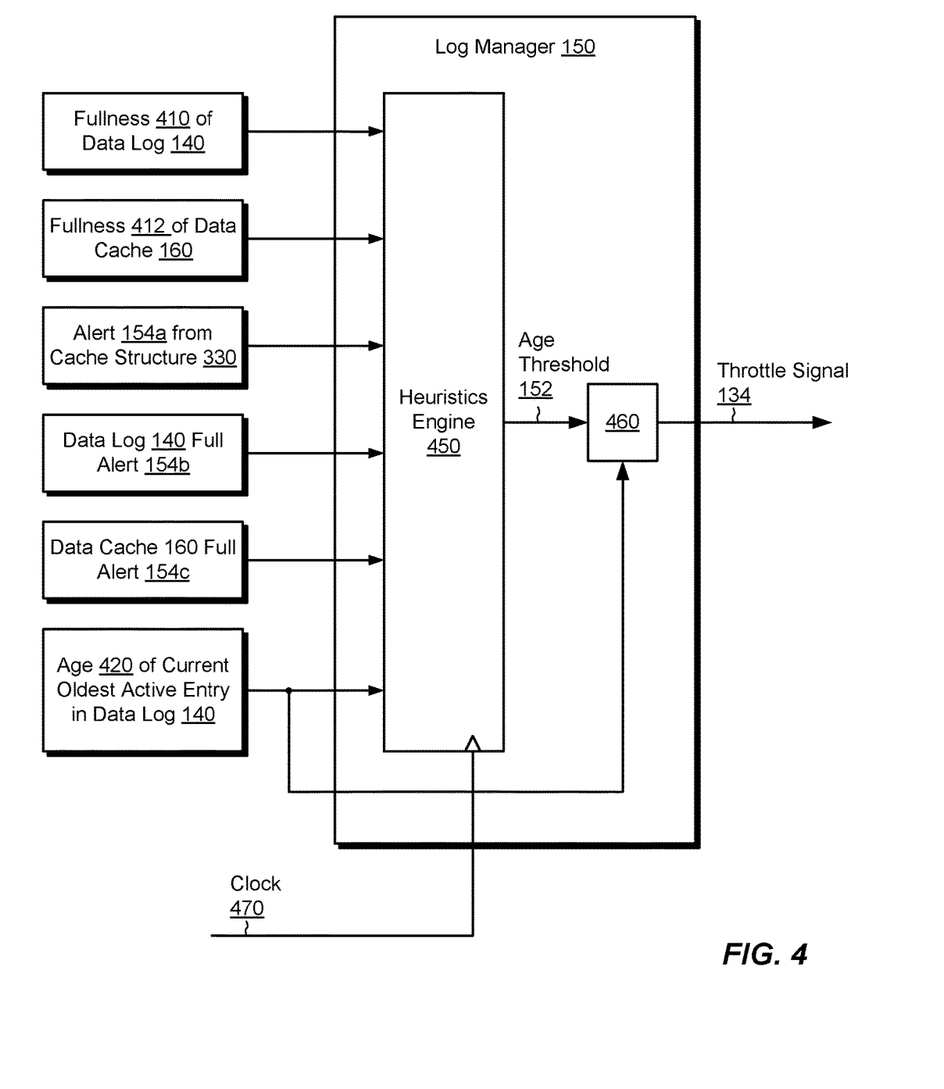
FIG. 4 is a block diagram showing an example arrangement for generating an age threshold and throttle signal based on system heuristics.

FIG. 4 shows an example implementation of certain features of the log manager 150 in additional detail. Here, it is seen that the log manager 150 includes a heuristics engine 450 and a condition evaluator 460. In an example, the heuristics engine 450 has the following inputs:

Fullness 410 of the data log 140, e.g., expressed as a percentage of space used over total size of the data log 140;

Fullness 412 of the data cache 160, e.g., expressed as a percentage of space used over total size of the data cache 160;

Alert 154a (described in connection with FIG. 3), indicating that the cache structure 330 is flushing prior to mapping; and Alert 154b, indicating that the data log 140 is full;

Alert 154c, indicating that the data cache 160 is full;

Age 420 of the oldest entry in the data log 140, e.g., expressed in milliseconds;

The heuristics engine 450 receives the above inputs and generates therefrom the age threshold 152. The condition evaluator 460 compares the age threshold 152 with the age of the currently oldest log entry 142 in the data log 140. If the age threshold 152 is greater than the age of the currently oldest log entry, the condition evaluator 460 sets the throttle signal 134 to FALSE. If the age threshold 152 is smaller than the age of the currently oldest log entry, the condition evaluator 460 sets the throttle signal 134 to TRUE. In an example, the heuristics engine 450 updates the age threshold 152 on a regular basis, e.g., based on clock 470, such as every half-second, every second, etc. Preferably, however, the condition evaluator 460 updates the throttle signal 134 continuously, i.e., in real time or nearly so, to reflect changes in the age 420 as time advances and as log entries 142 are flushed from the data log 140.

The heuristics engine 450 can generate the age threshold 152 in a variety of ways, the particulars of which are not critical to the invention hereof. The following is merely an illustrative example.

Initially, when the data log 140 is first brought online, the heuristics engine 450 may set the age threshold 152 to a maximum value, such as several seconds. In an example, this maximum value is slightly less than the N seconds referred to above in connection with FIG. 3, which is the minimum time that the cache structure 330 stores host data for the data log 140 prior to flushing.

In some examples, for each increase in fullness 410 or 412, the heuristics engine 450 reduces the age threshold 152 by a proportional amount, such as 100 milliseconds for each 5% change.

In some examples, the heuristics engine 450 reduces the age threshold 152 in proportion to an increase in age 420 of the oldest current log entry. For example, for each increase in age 420 of 100 milliseconds, the heuristics engine 450 decreases the age threshold 152 by 100 milliseconds.

In some examples, the heuristics engine 450 looks at increases across both fullness measures 410 and 412, expresses each measure of fullness 410 and 412 as a respective time interval (as described above), and then takes a maximum of three values, the two time intervals and the increase in age 420. The heuristics engine 450 then decreases the age threshold 152 by an amount of time equal to the computed maximum. For instance, if fullness 410 of the data log 140 increases by 5% (implying 100 milliseconds), fullness of the data cache 160 increases by 10% (implying 200 milliseconds), and age 420 increases by 100 milliseconds, then the heuristics engine 450 may reduce the age threshold 152 by the maximum of the three, or 200 milliseconds.

The heuristics engine 450 may operate in a similar manner for changes in the opposite direction. For instance, if fullness 410 of the data log 140 decreases by 10% (implying negative 200 milliseconds), fullness of the data cache 160 decreases by 5% (implying negative 100 milliseconds), and age 420 decreases by 300 milliseconds, then the heuristics engine 450 may increase the age threshold 152 by the maximum of the three, or 100 milliseconds.

In response to receiving of any of alerts 154a, 154b, and 154c, which indicate critical conditions, the heuristics engine 450 may reduce the age threshold 152 by a large amount, such as hundreds of milliseconds (e.g., 500 milliseconds). This change may cause the data log 140 to refuse new log entries 142 for a period of time that enables the data storage system 116 to perform necessary flushing, mapping, and so forth, to recover from the condition that gave rise to the alert 154.

Figure 5:
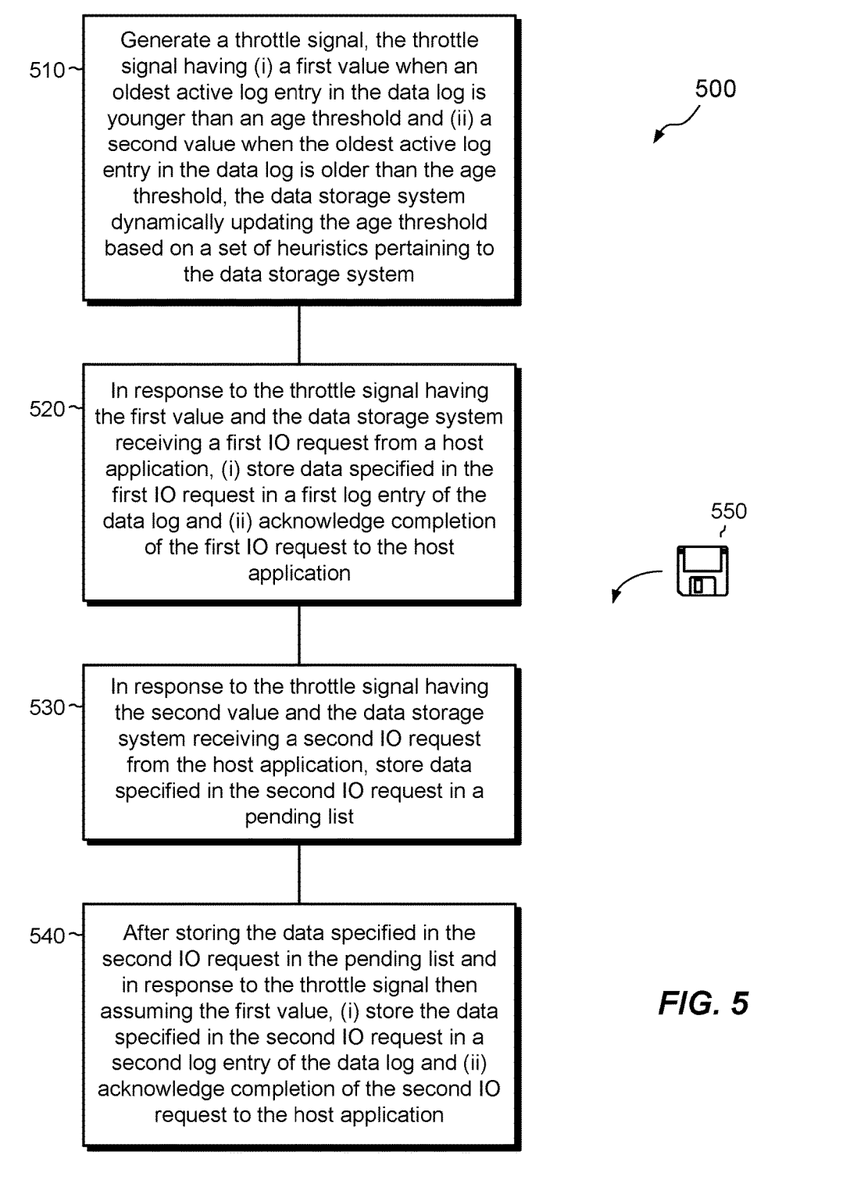
FIG. 5 is a flow chart showing an example method of controlling acceptance of host application data into a data log in a data storage system.

FIG. 5 shows an example process 500 that may be carried out in connection with the data storage system 116. The process 500 is typically performed by the software constructs, described in connection with FIGS. 1-3, which reside in the memory 130 of the storage processor 120 and are run by the set of processing units 124. The various acts of the process 500 may be ordered in any suitable way. Accordingly, embodiments may be constructed in which acts are performed in orders different from that illustrated, which may include performing some acts simultaneously, even though the acts are shown as sequential in the illustrated embodiments.

At 510, a throttle signal 134 is generated. The throttle signal 134 has (i) a first value, e.g., FALSE, when an oldest active log entry in the data log 140 is younger than an age threshold 152 and (ii) a second value, e.g., TRUE, when the oldest active log entry in the data log 140 is older than the age threshold 152. The data storage system 116 dynamically updates the age threshold 152 based on a set of heuristics pertaining to the data storage system 116, such as those shown in FIG. 4.

At 520, in response to the throttle signal 134 having the first value and the data storage system 116 receiving a first IO request 112a from a host application 110a, (i) data specified in the first IO request 112a is stored in a first log entry of the data log 140 and (ii) completion of the first IO request 112a is acknowledged, e.g., via acknowledgement 118a, to the host application 110a.

At 530, in response to the throttle signal 134 having the second value and the data storage system 116 receiving a second IO request 112b from the host application 110a, data specified in the second IO request 112b is stored in a pending list 170.

At 540, after storing the data specified in the second IO request 112b in the pending list 170 and in response to the throttle signal 134 then assuming the first value, (i) the data specified in the second IO request 112b is stored in a second log entry of the data log 140 and (ii) completion of the second IO request 112b is acknowledged to the host application 110a.

An improved technique has been disclosed for controlling acceptance of host application data into a data log 140 in a data storage system 116. The technique includes selectively accepting or refusing newly arriving host data into the data log 140 based on a comparison between an oldest entry in the data log 140 and an age threshold 152. The age threshold 152 is dynamically updated based on system heuristics. As long as the oldest log entry is younger than the age threshold 152, the data log 140 continues to accept newly arriving host application data, acknowledging IO requests 112 to host applications 110a as the data specified in those requests is entered into the log 140. However, when the oldest log entry is older than the age threshold 152, new log entries are temporarily refused entry into the data log 140. Instead, newly arriving data are placed in a pending list, where they are kept until the data log 140 is again accepting new log entries.

Having described certain embodiments, numerous alternative embodiments or variations can be made. For example, the illustrated embodiments have shown the host application 110a as running on a host machine 110 that is distinct from the data storage system 116. This is merely an example, however. Alternatively, the host application 110a may run on the SP 120. In such examples, the data storage system 116 may be regarded as including only those portions of the SP 120 that are used for data storage purposes, with other portions of the SP 120 used for running the host application 110a.

Also, although the data log 140 has been described on the basis of one per internal file system and the data cache 160 has been described on the basis of one per system, these are merely examples. Alternatively, these structures may be provided at other levels of granularity, the particular details of which are not critical to the invention hereof.

Further, although the heuristics engine 450 has been described as generating the age threshold 152 based on certain specified inputs, these inputs are merely examples, as the heuristics engine 450 may generate the age threshold 152 based on any inputs pertaining to resource utilization in the data storage system 116.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of dynamically controlling acceptance of host application data into a data log in a data storage system, the method comprising:

generating a throttle signal, the throttle signal having (i) a first value when an oldest log entry in the data log is younger than an age threshold and (ii) a second value when the oldest log entry in the data log is older than the age threshold, the data storage system dynamically updating the age threshold based on a set of heuristics pertaining to the data storage system;

in response to the throttle signal having the first value and the data storage system receiving a first IO request from a host application, (i) storing data specified in the first IO request in a first log entry of the data log and (ii) acknowledging completion of the first IO (Input/Output) request to the host application;

in response to the throttle signal having the second value and the data storage system receiving a second IO request from the host application, storing data specified in the second IO request in a pending list; and after storing the data specified in the second IO request in the pending list and in response to the throttle signal then assuming the first value, (i) storing the data specified in the second IO request in a second log entry of the data log and (ii) acknowledging completion of the second IO request to the host application.

2. The method of claim 1, further comprising:
with the throttle signal having the second value, flushing multiple log entries from the data log, the log entries including the oldest log entry, such that a log entry younger than the oldest log entry becomes a new oldest log entry; and changing the throttle signal from the second value to the first value in response to the new oldest log entry in the data log being older than the age threshold.

3. The method of claim 2, wherein the data storage system persistently stores the data log but non-persistently stores the pending list.

4. The method of claim 3, wherein the set of heuristics includes a measure of fullness of the data log, and wherein the method further comprises:
decreasing the age threshold in response to detecting that the measure of fullness of the data log has increased; and
increasing the age threshold in response to detecting that the measure of fullness of the data log has decreased.

5. The method of claim 3, wherein the set of heuristics includes an age of a current oldest entry in the data log, and wherein the method further comprises:
decreasing the age threshold in response to detecting that the age of the current oldest entry in the data log has increased; and
increasing the age threshold in response to detecting that the age of the current oldest entry in the data log has decreased.

6. The method of claim 3, further comprising, when storing data in log entries of the data log, also storing metadata describing those log entries in a volatile data cache, wherein the set of heuristics includes a measure of fullness of the volatile data cache, and wherein the method further comprises:
decreasing the age threshold in response to detecting that the measure of fullness of the volatile data cache has increased; and
increasing the age threshold in response to detecting that the measure of fullness of the volatile data cache has decreased.

7. The method of claim 3, further comprising:
when storing data in log entries of the data log, also storing metadata describing those log entries in a volatile data cache,
wherein the set of heuristics includes (i) a measure of fullness of the data log, (ii) an age of a current oldest entry in the data log, and (iii) a measure of fullness of the volatile data cache,
and wherein the method further comprises:
decreasing the age threshold in response to detecting an increase in any of (i) the measure of fullness of the data log, (ii) the age of the current oldest entry in the data log, and (iii) the measure of fullness of the volatile data cache; and
increasing the age threshold in response to detecting a decrease in any of (i) the measure of fullness of the data log, (ii) the age the current oldest entry in the data log, and (iii) the measure of fullness of the volatile data cache.

8. The method of claim 7, wherein dynamically updating the age threshold based on a set of heuristics includes regenerating the age threshold on a periodic basis.

9. The method of claim 8, wherein the method further comprises decreasing the age threshold by at least hundreds of milliseconds in response to the data log becoming full.

10. The method of claim 9, wherein the method further comprises decreasing the age threshold by at least hundreds of milliseconds in response to the data cache becoming full.

11. The method of claim 10, wherein the data storage system includes a data log manager that manages the data log, and wherein the method further comprises:
backing a set of log entries in the data log in a cache structure, the cache structure configured to flush each of the set of log entries to non-volatile storage either (i) to a first storage location or (ii) to a second storage location;
receiving, by the data log manager, an alert from the cache structure, the alert indicating that at least one of the set of log entries has been flushed to the first storage location; and
in response to receiving the alert, decreasing the age threshold by at least hundreds of milliseconds.

12. A data storage system, comprising control circuitry that includes a set of processing units coupled to memory, the control circuitry constructed and arranged to:
generate a throttle signal, the throttle signal having (i) a first value when an oldest log entry in the data log is younger than an age threshold and (ii) a second value when the oldest log entry in the data log is older than the age threshold, the data storage system configured to dynamically update the age threshold based on a set of heuristics pertaining to the data storage system;
in response to the throttle signal having the first value and the data storage system receiving a first IO request from a host application, (i) store data specified in the first IO (Input/Output) request in a first log entry of the data log and (ii) acknowledge completion of the first IO request to the host application;
in response to the throttle signal having the second value and the data storage system receiving a second IO request from the host application, store data specified in the second IO request in a pending list; and
after storing the data specified in the second IO request in the pending list and in response to the throttle signal then assuming the first value, (i) store the data specified in the second IO request in a second log entry of the data log and (ii) acknowledge completion of the second IO request to the host application.

13. A computer program product including a set of non-transitory, computer-readable media having instructions which, when executed by control circuitry of a data storage system, cause the control circuitry to perform a method for dynamically controlling acceptance of host application data into a data log in a data storage system, the method comprising:
generating a throttle signal, the throttle signal having (i) a first value when an oldest log entry in the data log is younger than an age threshold and (ii) a second value when the oldest log entry in the data log is older than the age threshold, the data storage system dynamically updating the age threshold based on a set of heuristics pertaining to the data storage system;
in response to the throttle signal having the first value and the data storage system receiving a first IO request from a host application, (i) storing data specified in the first IO request in a first log entry of the data log and (ii) acknowledging completion of the first IO (Input/Output) request to the host application;
in response to the throttle signal having the second value and the data storage system receiving a second IO request from the host application, storing data specified in the second IO request in a pending list; and
after storing the data specified in the second IO request in the pending list and in response to the throttle signal then assuming the first value, (i) storing the data specified in the second IO request in a second log entry of the data log and (ii) acknowledging completion of the second IO request to the host application.

14. The computer program product of claim 13, wherein the method further comprises:
with the throttle signal having the second value, flushing multiple log entries from the data log, the log entries including the oldest log entry, such that a log entry younger than the oldest log entry becomes a new oldest log entry; and
changing the throttle signal from the second value to the first value in response to the new oldest log entry in the data log being older than the age threshold.

15. The computer program product of claim 14, wherein the set of heuristics includes a measure of fullness of the data log, and wherein the method further comprises:
decreasing the age threshold in response to detecting that the measure of fullness of the data log has increased; and
increasing the age threshold in response to detecting that the measure of fullness of the data log has decreased.

16. The computer program product of claim 14, wherein the method further comprises:
when storing data in log entries of the data log, also storing metadata describing those log entries in a volatile data cache,
wherein the set of heuristics includes (i) a measure of fullness of the data log, (ii) an age of a current oldest entry in the data log, and (iii) a measure of fullness of the volatile data cache,
and wherein the method further comprises:
decreasing the age threshold in response to detecting an increase in any of (i) the measure of fullness of the data log, (ii) the age of the current oldest entry in the data log, and (iii) the measure of fullness of the volatile data cache; and
increasing the age threshold in response to detecting a decrease in any of (i) the measure of fullness of the data log, (ii) the age the current oldest entry in the data log, and (iii) the measure of fullness of the volatile data cache.

17. The computer program product of claim 16, wherein dynamically updating the age threshold based on a set of heuristics includes regenerating the age threshold on a periodic basis.

18. The computer program product of claim 17, wherein the method further comprises decreasing the age threshold by at least hundreds of milliseconds in response to the data log becoming full.

19. The computer program product of claim 18, wherein the method further comprises decreasing the age threshold by at least hundreds of milliseconds in response to the data cache becoming full.

20. The computer program product of claim 19, wherein the data storage system includes a data log manager that manages the data log, and wherein the method further comprises:
backing a set of log entries in the data log in a cache structure, the cache structure configured to flush each of the set of log entries to non-volatile storage either (i) to a first storage location or (ii) to a second storage location;
receiving, by the data log manager, an alert from the cache structure, the alert indicating that at least one of the set of log entries has been flushed to the first storage location; and
in response to receiving the alert, decreasing the age threshold by at least hundreds of milliseconds.

* * * * *